Dec. 6, 1960          B. L. RODGERS          2,963,254
COLLAPSIBLE FUEL BARREL RACK FOR TRAILERS
Filed Feb. 3, 1959          2 Sheets-Sheet 2
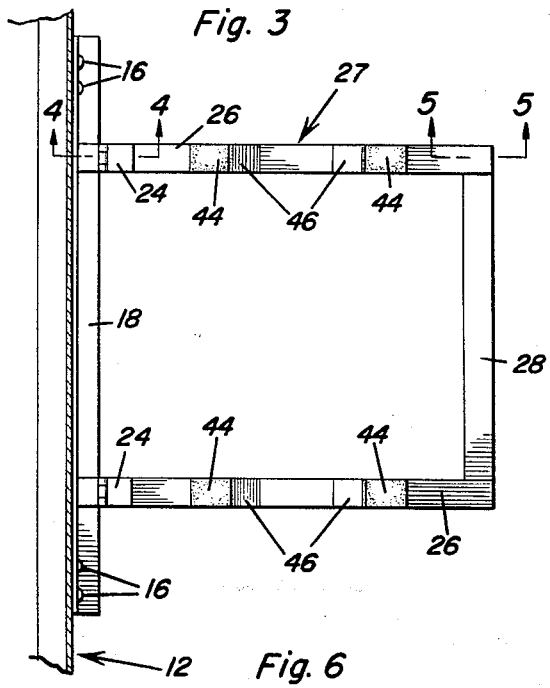
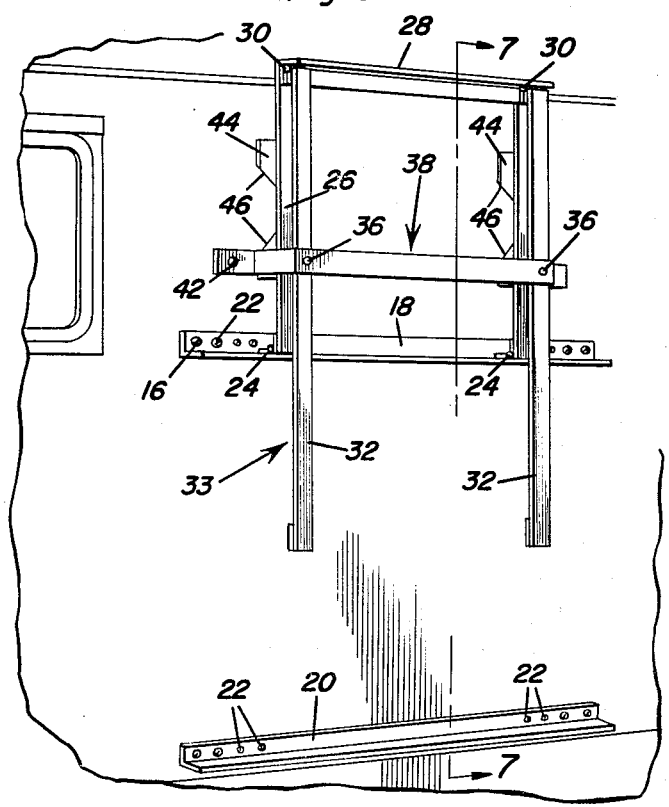
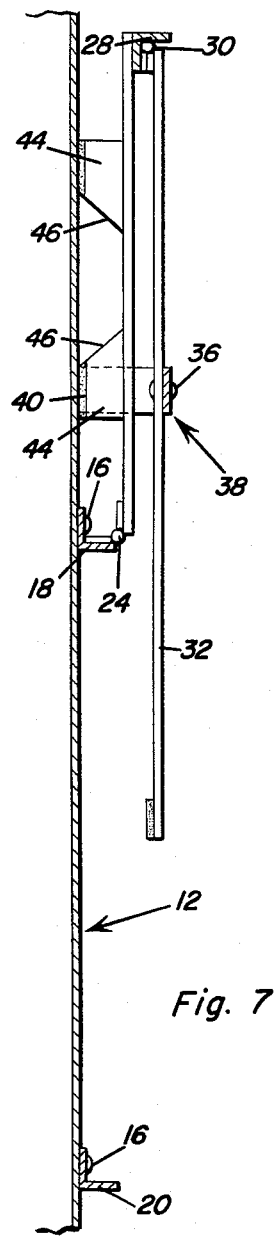
Birdy L. Rodgers
INVENTOR.

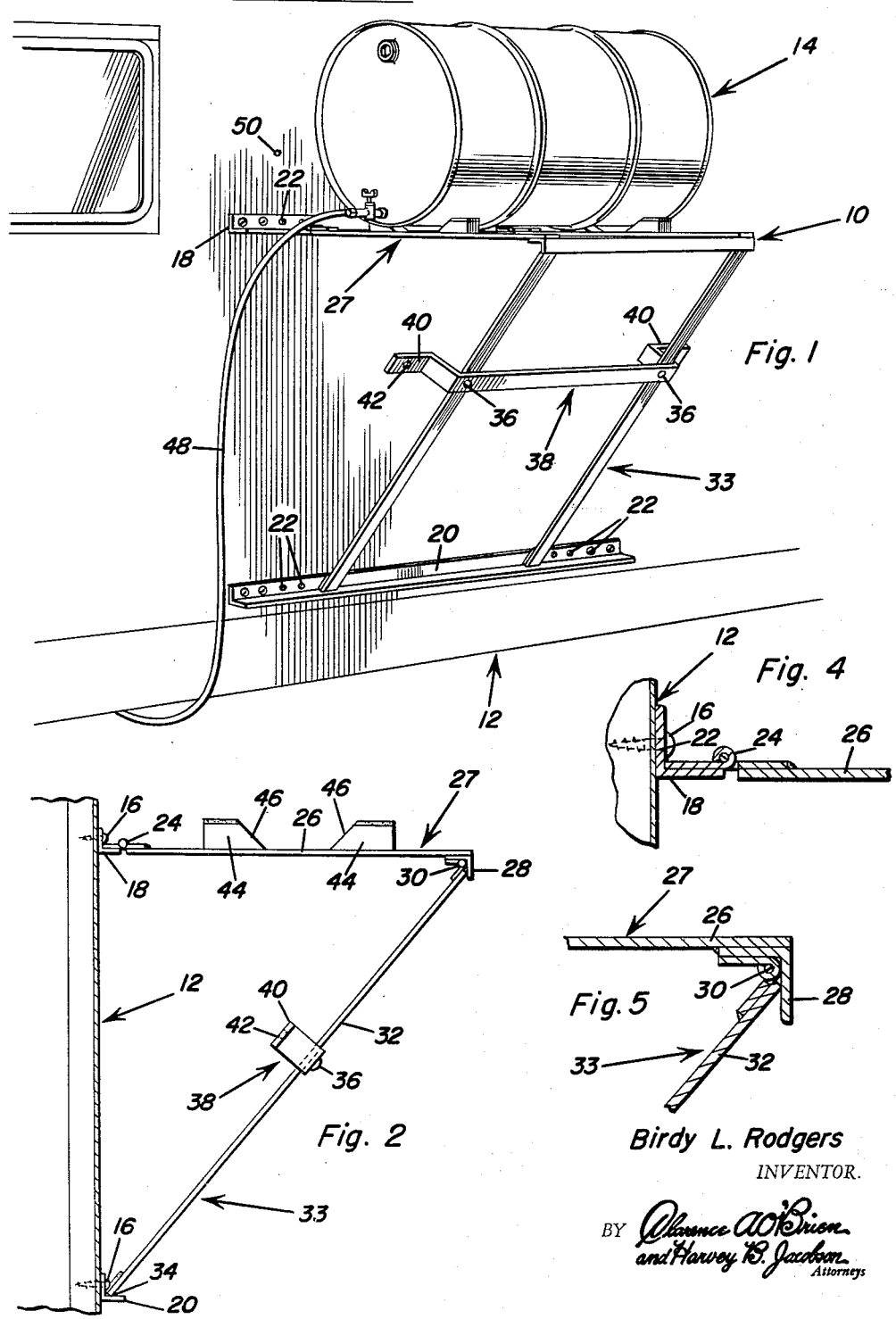

United States Patent Office 2,963,254
Patented Dec. 6, 1960

2,963,254

COLLAPSIBLE FUEL BARREL RACK FOR TRAILERS

Birdy L. Rodgers, 2800 Lawrence Blvd., Alamogordo, N. Mex.

Filed Feb. 3, 1959, Ser. No. 790,934

3 Claims. (Cl. 248—311)

This invention relates to a novel and useful collapsible fuel barrel rack for trailers which may be used to support a fuel barrel upon the side of a house trailer when the trailer is in an area remote from any source of fuel.

Due to the popularity of house trailers at this time, many modern conveniences have been built into the trailers in an attempt to create more pleasing living conditions, and thus a larger market for the house trailers. Of course, the most desired is the fuel burning heating systems which are very much like those found in the houses of today that have been incorporated into house trailers. A need has therefore been created for fuel supply for the heating systems which are, in most instances barrels used by the oil companies for containers for marketing their products, usually of a 30 to 55 gallon capacity. A barrel of this size would unquestionably take up a great deal of valuable storage of living space which is very limited in mobile home living.

The main object of this invention is to provide a collapsible fuel barrel rack for trailers which will retain fuel barrels of this type upon the exterior of a house trailer, at a level higher than the heating unit itself so that a fuel pump in connection therewith is not needed.

A further object of this invention is to provide a collapsible fuel barrel rack for trailers which may be folded flat upon the exterior surface of the trailer so that while the trailer is in movement from place to place the rack will not extend substantially beyond the side of the trailer creating a violation of the maximum width laws which are enforced in most States.

A further object of this invention, in accordance with the preceding objects, is to provide a device which will substantially secure an oil drum in stationary position upon the side of a house trailer.

A still further object, in accordance with the preceding objects, is to provide a collapsible fuel barrel rack for trailers which has incorporated therein means for retaining the rack when folded, upon the side of the trailer.

Yet a further object of this invention, in accordance with the preceding objects, is to provide a fuel barrel rack which is economical to manufacture and lends itself to conventional methods of mass production.

A still further object, in accordance with the preceding objects, is to provide a device which will be easy to operate and one which will be sturdy in construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the invention shown mounted upon the side of a house trailer with a fuel barrel mounted thereon;

Figure 2 is a side elevational view of the invention shown mounted on the side of a house trailer in position ready to support a fuel barrel, parts of the trailer being shown in section;

Figure 3 is a top plan view of the device as seen in Figure 2;

Figure 4 is an enlarged longitudinal vertical sectional view of one of the supporting arms of the rack taken substantially upon the plane indicated by the section line 4—4 of Figure 3, parts of the house trailer and rack being broken away;

Figure 5 is an enlarged longitudinal vertical sectional view of the device showing the manner in which one of the supporting legs is hinged to one of the support arms taken substantially upon the plane indicated by the section line 5—5 of Figure 3, parts being broken away;

Figure 6 is a perspective view of the invention shown in folded position upon the side of a house trailer; and, Figure 7 is an enlarged vertical sectional view of the invention taken substantially upon the plane indicated by the section line 7—7 of Figure 6.

Referring now more specifically to Figure 1 of the drawings, the numeral 10 generally designates a fuel barrel rack comprising the present invention shown mounted on the side of a house trailer 12 and supporting a fuel barrel 14. Removably secured to the trailer 12 by any suitable fastening means such as screws 16, see Figures 2 and 4, are upper angle support bracket 18 and lower angle support bracket 20. Longitudinally spaced apertures 22 are provided in each of the angle support brackets to receive therethrough screws 16.

With attention now drawn to Figure 4 of the drawings, secured to upper angle support bracket 18, in any convenient manner, is one arm of hinges 24, the other arm of each being connected, again in any convenient manner, to the inner end of the support arms 26 which are secured in spaced parallel relation to form the supporting portion 27 of the fuel barrel rack 10. The support arms 26, have in this manner, their inner ends pivotally mounted upon the trailer 12, and attain when in the supporting position, a substantially horizontal position. As can best be seen by Figure 3 of the drawings, the support arms 26 are in parallel spaced relation to each other and have connected between their outer ends a cross member 28.

Cross member 28 as can best be seen in Figure 2, is an angle plate which has secured to its horizontal portion one leg of each of a pair of hinges 30, the other leg of each being secured, in any convenient manner, to one of the supporting legs 32. The lower ends of supporting legs 32 are engaged and supported by lower angle support bracket 20 as seen at 34. The supporting legs 32 are in spaced parallel relation to each other and form the bracing portion 33 of the fuel barrel rack 10, and the supporting legs 32 are attached by hinges 30 to the underside of the cross member 28 substantially beneath the points at which the outer ends of support arms 26 are secured thereto.

Mounted transversely across the support legs 32 intermediate the ends thereof by means of suitable fasteners 36 is a retaining bracket or brace member 38 which is generally U-shaped and has outturned end portions 40. The retaining bracket 38 serves as a brace member between the support legs 32. Formed through each outturned end portion 40 of the retaining bracket 32 is a bore 42.

Fixedly secured in longitudinal spaced relation to the upper surfaces of each of the support arms 26 are two blocks 44 constructed of any suitable material having upwardly divergent confronting surfaces 46. Each pair of blocks 44 is secured to support arms 26 in spaced relation so that their confronting inclined surfaces will embrace the lower sides of a fuel barrel 14 resting therebetween.

In operation, after having once secured both angle support brackets 18 and 20 upon the side of a trailer 12, the lower ends of support legs 32 are engaged in the pocket of the lower angle bracket 20 as shown at 34 in Figure 2 of the drawings. The support arms 26 have then obtained a horizontal position, and the fuel barrel 14 may then be placed on its side between blocks 44. When it is desired to move the house trailer, the fuel line 48 is removed from the barrel 14 and the barrel is then lifted from the rack and stored in a convenient place within the trailer. The outer end of the rack 10 is then pushed upward until the support arms 26 are vertical with the sides of the trailer, and then the supporting legs 32 are folded down in overlying relation upon the support arms 26 and fasteners (not shown) are secured through bores 42 formed in the outturned end portions 40 of the retaining brackets 38 and secured in bores 50, which may or may not be threaded depending upon the fasteners used, formed in the side of the trailer 12 and registrable with bore 42. In this manner the collapsible fuel barrel rack is retained in a folded position upon the side of a trailer so that it does not project a substantial amount from the side thereof while the trailer is in movement from place to place.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination, a vertical supporting surface and a collapsible fuel barrel rack comprising upper and lower support brackets, means securing said brackets to said vertical supporting surface in relatively vertically spaced positions, a support means including two frame-like portions, said portions being pivotally secured to each other at adjoining ends, one end of said support means being pivotally secured to said upper bracket and the opposite end of said support means being removably supported by said lower bracket, the opposite ends of said support means being spaced apart with one of said portions being substantially horizontally disposed, said other portion including two depending supporting legs having lower ends adapted to removably engage said lower support bracket, a transverse brace member secured between said legs intermediate the opposite ends thereof, the opposite ends of said brace member terminating in inwardly and laterally offset end portions, said end portions being offset an amount equal to the thickness of said support means when each of said frame-like portions are vertically disposed and said support means is in the folded position closely adjacent said supporting surface whereby said end portions will abut said supporting surface, said end portions having means adapted for securement to said supporting surface whereby said support means will be secured in a folded position.

2. The combination of claim 1 including means secured to the upper surface of said one portion adapted to embrace the lower surfaces of a fuel barrel supported thereby.

3. The combination of claim 2 wherein the inner end of said one portion is pivotally secured to said upper bracket for upward swinging movement to fold said support means, said embracing means including spaced blocks secured to the upper surface of said one portion having upwardly divergent confronting surfaces, said blocks projecting above said one portion a sufficient amount to abut against said supporting surface when said support means is in the folded position with said end portions abutting said supporting surface.

References Cited in the file of this patent

UNITED STATES PATENTS

| | | |
|---|---|---|
| 921,855 | Loskamp | May 18, 1909 |
| 1,515,242 | Dexter | Nov. 11, 1924 |
| 1,605,510 | Carskadon | Nov. 2, 1926 |
| 2,862,631 | Gamble | Dec. 2, 1958 |